United States Patent
Desai et al.

(10) Patent No.: US 10,411,537 B2
(45) Date of Patent: Sep. 10, 2019

(54) ROTOR LAMINATION AND RELATED ROTOR AND ELECTRIC MOTOR INCORPORATING SAME

(71) Applicant: American Axle & Manufacturing, Inc., Detroit, MI (US)

(72) Inventors: Ravi Desai, Troy, MI (US); Yogesh Mehta, Rochester Hills, MI (US); Wei Li, Troy, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 254 days.

(21) Appl. No.: 15/665,556

(22) Filed: Aug. 1, 2017

(65) Prior Publication Data
US 2018/0054101 A1    Feb. 22, 2018

Related U.S. Application Data

(60) Provisional application No. 62/377,702, filed on Aug. 22, 2016.

(51) Int. Cl.
*H02K 21/12* (2006.01)
*H02K 1/27* (2006.01)
(Continued)

(52) U.S. Cl.
CPC ........... *H02K 1/2766* (2013.01); *H02K 1/185* (2013.01); *H02K 1/246* (2013.01); *H02K 1/276* (2013.01);
(Continued)

(58) Field of Classification Search
CPC ...... H02K 1/2766; H02K 1/185; H02K 1/246; H02K 1/276; H02K 1/278; H02K 21/16; H02K 1/146; H02K 3/522
(Continued)

(56) References Cited

U.S. PATENT DOCUMENTS

| | | | |
|---|---|---|---|
| 4,110,646 A | 8/1978 | Rao | |
| 2005/0104468 A1* | 5/2005 | Araki | H02K 1/2766 310/156.53 |

(Continued)

FOREIGN PATENT DOCUMENTS

| | | |
|---|---|---|
| CN | 102946158 A | 2/2013 |
| CN | 104882981 A | 9/2015 |

OTHER PUBLICATIONS

CN Office Action dated Mar. 11, 2019.

*Primary Examiner* — Thanh Lam

(74) *Attorney, Agent, or Firm* — Harness, Dickey & Pierce, P.L.C.

(57) ABSTRACT

A rotor lamination for an electric motor includes a body and a plurality of tangs. The body defines a shaft aperture, which defines a rotor axis, a plurality of flux directing aperture (FDA) sets, and a plurality of mass reduction apertures that are formed through the body. The FDA sets are spaced circumferentially about the body and each includes one or more apertures that are configured to receive a permanent magnet therein and/or form a flux barrier. The mass reduction apertures are disposed radially between the shaft aperture and the plurality of flux directing aperture sets. Each of the tangs is coupled to the body and extends radially inward into the shaft aperture. Each of the tangs has a pair of side walls that are disposed about a first centerline that intersects the rotor axis and an associated one of the mass reduction apertures that is disposed radially outwardly therefrom.

8 Claims, 2 Drawing Sheets

(51) Int. Cl.
*H02K 1/18* (2006.01)
*H02K 1/24* (2006.01)
*H02K 21/16* (2006.01)
*H02K 1/14* (2006.01)
*H02K 3/52* (2006.01)

(52) U.S. Cl.
CPC ............ *H02K 1/278* (2013.01); *H02K 21/16* (2013.01); *H02K 1/146* (2013.01); *H02K 3/522* (2013.01)

(58) Field of Classification Search
USPC ............ 310/156.01, 156.09, 156.53–156.57
See application file for complete search history.

(56) References Cited

U.S. PATENT DOCUMENTS

| | | | | |
|---|---|---|---|---|
| 2010/0013350 A1* | 1/2010 | Fu | ............................ | H02K 1/28 310/261.1 |
| 2012/0091846 A1* | 4/2012 | Nagai | ................... | H02K 1/2766 310/156.01 |
| 2012/0206007 A1* | 8/2012 | Kitagawa | ............. | H02K 1/2766 310/156.08 |
| 2018/0076700 A1* | 3/2018 | Nagai | ................... | H02K 15/165 |

* cited by examiner r = 0.75mm

ROTOR LAMINATION AND RELATED ROTOR AND ELECTRIC MOTOR INCORPORATING SAME

CROSS-REFERENCE TO RELATED APPLICATIONS

This application claims the benefit of U.S. Provisional Patent Application No. 62/377,702 filed Aug. 22, 2016, the disclosure of which is incorporated by reference as if fully set forth in detail herein.

FIELD

The present disclosure relates to a rotor lamination and a related rotor and electric motor incorporating same.

SUMMARY

This section provides a general summary of the disclosure, and is not a comprehensive disclosure of its full scope or all of its features.

In one form, the present disclosure provides an electric motor having a rotor lamination with a lamination body and a plurality of tangs. The lamination body defines a shaft aperture, a plurality of flux directing aperture sets, and a plurality of mass reduction apertures that are formed through the lamination body. The shaft aperture defines a rotor axis. Each of the flux directing aperture sets includes one or more apertures that are configured to receive a permanent magnet therein and/or form a flux barrier. The flux directing aperture sets are spaced circumferentially about the lamination body. The mass reduction apertures are disposed radially between the shaft aperture and the plurality of flux directing aperture sets. Each of the tangs is coupled to the lamination body and extends radially inward into the shaft aperture. Each of the tangs has a pair of side walls that are disposed about a first centerline that intersects the rotor axis and an associated one of the mass reduction apertures that is disposed radially outwardly therefrom.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
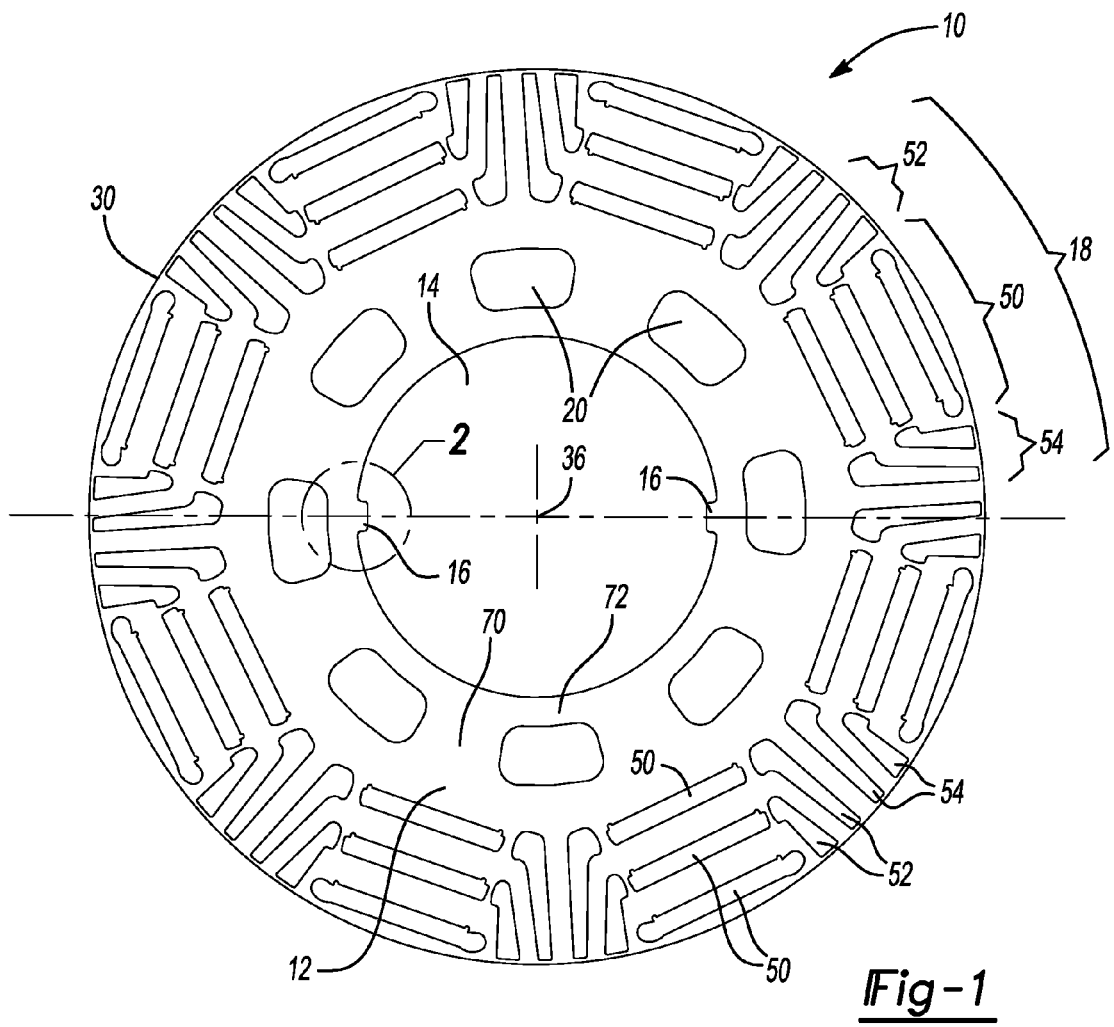
FIG. 1 is a front elevation view of an exemplary rotor lamination constructed in accordance with the teachings of the present disclosure.

With reference to FIG. 1, an exemplary rotor lamination constructed in accordance with the teachings of the present disclosure is generally indicated by reference numeral 10. The rotor lamination 10 is configured to be employed with a plurality of other rotor laminations 10 in the construction of a transversely laminated rotor (not shown) of an electric motor (not shown). The electric motor can be any type of appropriate motor, such as a reluctance motor (e.g., a synchronous reluctance motor). In the particular example provided, the rotor lamination 10 is employed in the construction of a rotor for a permanent magnet assisted synchronous reluctance motor. Aside from the construction of the rotor lamination 10 and the mounting of the rotor lamination to a central rotor shaft (not shown), the remainder of the electric motor can be constructed in a conventional and well known manner.

The rotor lamination 10 can be formed of a magnetically-susceptible material, such as steel, in a conventional manner, such as stamping from a sheet-stock (e.g., sheet steel). The rotor lamination 10 can define a lamination body 12, a shaft aperture 14, a plurality of tangs 16, a plurality of flux directing aperture sets 18 and a plurality of mass reduction apertures 20.

The lamination body 12 can have an outer peripheral surface or edge 30 that can be shaped in any desired manner, but in the example provided, the outer peripheral edge 30 has a circular shape. The shaft aperture 14 can be formed through the lamination body 12 and can be shaped and sized to receive a rotor shaft (FIG. 3) there through. In the example provided, the shaft aperture 14 is generally circular in shape to receive the generally cylindrically-shaped rotor shaft S (FIG. 3) and is sized to engage the rotor shaft with an interference fit, such as a light press fit.

The shaft aperture 14 defines a rotor axis 36 about which the rotor lamination 10 rotates when the electric motor is operated.

Figure 2:
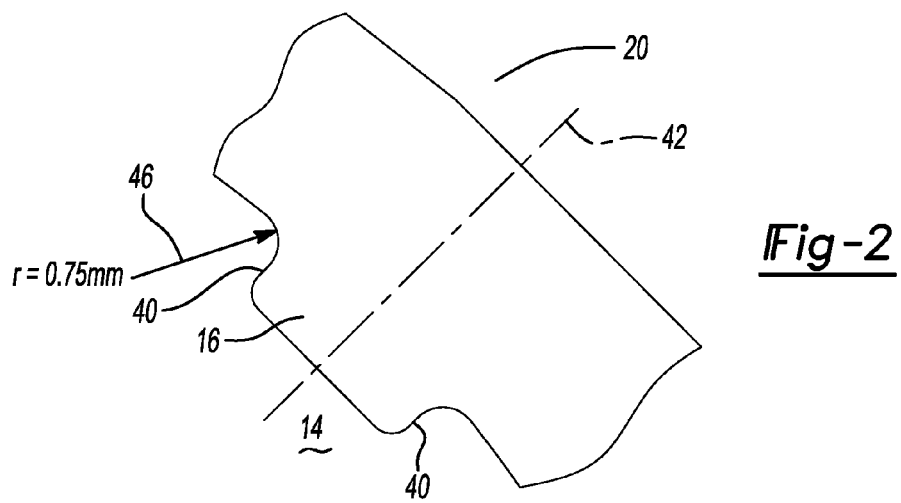
FIG. 2 is an enlarged portion of FIG. 1.

With reference to FIGS. 1 and 2, the tangs 16 can be spaced about the circumference of the shaft aperture 14 in any desired manner, such as symmetrically about the rotor axis 36, and can extend radially inward from the lamination body 12. The tangs 16 are configured to be received into corresponding grooves G (FIG. 3) formed longitudinally along the rotor shaft. Each tang 16 can have a pair of side walls 40 that can be disposed about a line 42 that can be disposed through the center of the tang 16 and intersect the rotor axis 36. In the example provided, the side walls 40 are parallel to the line 42, but it will be appreciated that the side walls 40 could be configured differently. For example, the side walls 40 could be radially offset about the rotor axis 36 from the line 42. The tangs 16 can intersect the lamination body 12 in any desired manner. For example, an undercut radius or a fillet radius 46 could be employed where the side walls 40 intersect the lamination body 12. In situations where a fillet radius 46 is employed, the edges of the longitudinal slots in the rotor shaft that receive the tangs 16 can be chamfered.

Figure 3:
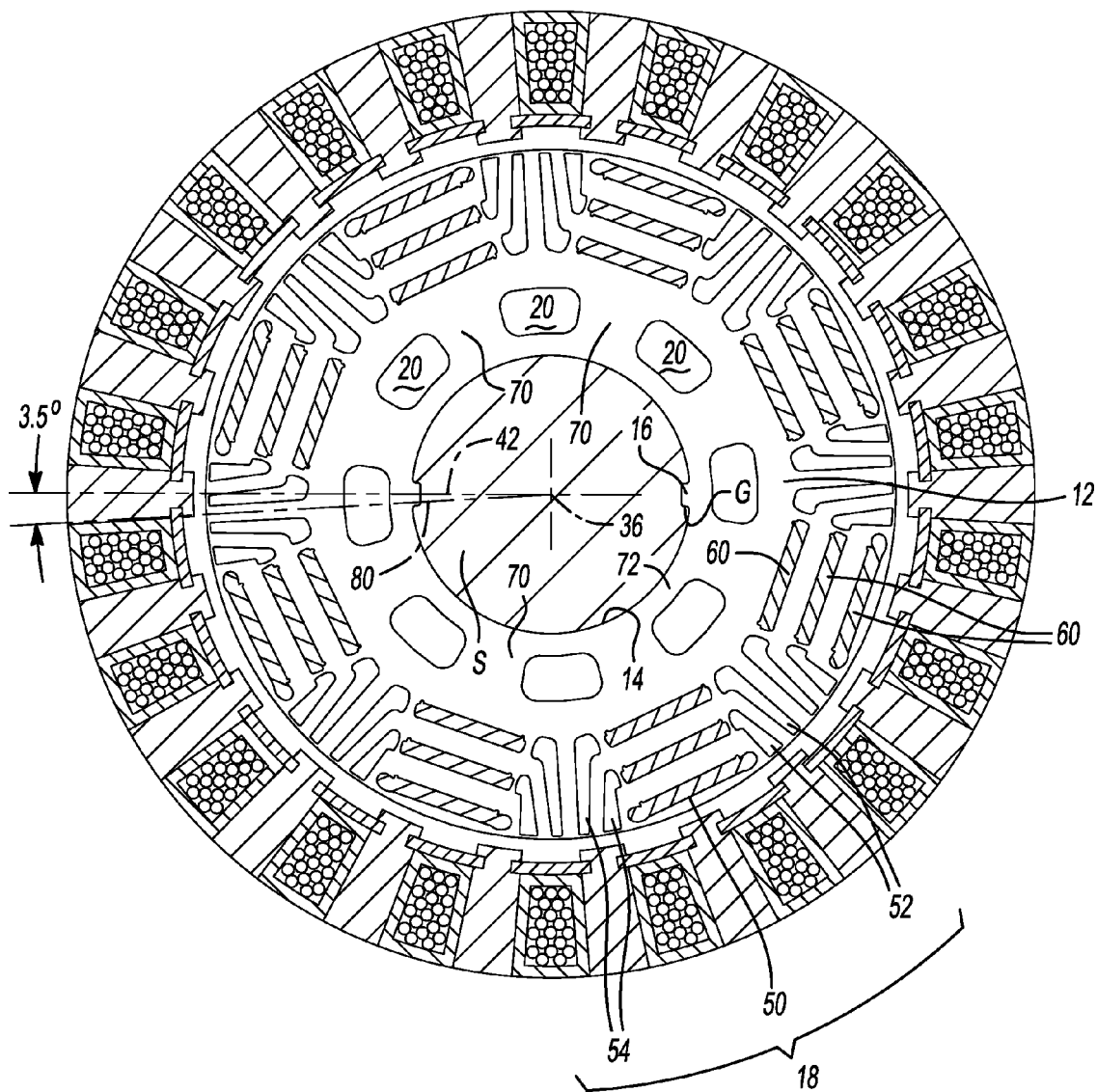
FIG. 3 is a sectional view of a rotor for an electric motor taken through the rotor transverse to the rotor (rotational) axis, the rotor employing the rotor lamination of FIG. 1.

With reference to FIGS. 1 and 3, each of the flux directing aperture sets 18 can include one or more apertures formed through the lamination body 12 that are configured to hold a permanent magnet, create a flux barrier, or both. In the particular example provided, each of the flux directing aperture sets 18 comprises a plurality of magnet apertures 50, a plurality of first flux barrier apertures 52 and a plurality of second flux barrier apertures 54. Each of the magnet apertures 50 is configured to receive an associated permanent magnet 60 (FIG. 3). In the particular example provided, three magnet apertures 50 are provided and are oriented about the lamination body 12 so as to provide the rotor with an embedded tangential magnet configuration. It will be appreciated that the magnet apertures 50 could be oriented differently, such as an orientation that provides the rotor with an embedded radial magnet configuration or an embedded inclined-V magnet configuration. The first and second flux barrier apertures 52 and 54 can be disposed on opposite ends of the magnet apertures 50 and can be configured to shape or guide magnetic flux that is transmitted between the rotor and the stator of the electric motor. In the particular example provided, the first and second flux barrier apertures 52 and 54 each number two (2) in quantity and are oriented in a radial direction, but the particular configuration and quantity of the apertures can vary from that which is depicted in the figures.

The mass reduction apertures 20 can be formed through the lamination body 12 at locations that are spaced symmetrically about the circumference of the lamination body 12 radially between the shaft aperture 14 and the flux directing aperture sets 18. The mass reduction apertures 20 can have any desired shape, but in the particular example provided, the mass apertures are have a generally trapezoidal shape in which each of the corners is rounded. A radial wall member 70 is disposed between each adjacent pair of the mass reduction apertures 20, and a circumferential wall segment 72 can be disposed between the radially inner edge of each mass reduction aperture 20 and the radially outer edge of the shaft aperture 14.

In a conventionally configured rotor lamination, each tang 16 would be oriented along a central axis of an associated one of the radial wall members 70 so that each tang 16 is centered between an adjacent pair of the mass reduction apertures 20. The tangs 16 of the rotor lamination 10, however, are disposed such that they are disposed circumferentially between an adjacent pair of the radial wall members 70 and the line 42 (that extends from the rotor axis 36 through the center of the tang 16) intersects the mass reduction aperture 20 that is located between the adjacent pair of radial wall members 70. If desired, the line 42 about which each tang 16 is formed can be offset in a circumferentially extending direction so that the line 42 does not interest the center or median axis 80 of the associated mass reduction aperture 20. In the particular example provided, the line 42 is offset by 3.5 degrees about the rotor axis 36 from a median axis 80 about which the associated mass reduction aperture 20 is formed. It will be appreciated that the median axis 80 intersects the rotor axis 36.

Configuration of the rotor laminate 10 in this manner is advantageous in that a rotor constructed of such rotor laminations 10 has an improved fatigue life relative to a configuration that places the tangs in their conventional location.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor having a rotor lamination with a lamination body and a plurality of tangs, the lamination body defining a shaft aperture, a plurality of flux directing aperture sets, and a plurality of mass reduction apertures formed therethrough, the shaft aperture defining a rotor axis, each of the flux directing aperture sets comprising one or more apertures that are configured to receive a permanent magnet therein, form a flux barrier or both receive a permanent magnet therein and form a flux barrier, the flux directing aperture sets being spaced circumferentially about the lamination body, the mass reduction apertures being disposed radially between the shaft aperture and the plurality of flux directing aperture sets, each of the tangs being coupled to the lamination body and extending radially inward into the shaft aperture, each of the tangs having a pair of side walls that are disposed about a first centerline that intersects the rotor axis and an associated one of the mass reduction apertures that is disposed radially outwardly therefrom.

2. The electric motor of claim 1, wherein each associated one of the mass reduction apertures has a second centerline that intersects the rotor axis, and wherein the first centerline is offset from the second centerline in a circumferential direction.

3. The electric motor of claim 1, further comprising an output member non-rotatably coupled to the rotor lamination.

4. The electric motor of claim 3, wherein the output member comprises a shaft that is received into the shaft aperture and engaged to the tangs.

5. The electric motor of claim 3, further comprising a plurality of magnets, each of the magnets being received in an associated one of the apertures in the plurality of flux directing aperture sets.

6. The electric motor of claim 1, further comprising a stator disposed about the rotor lamination.

7. The electric motor of claim 1, wherein the electric motor is a reluctance motor.

8. The electric motor of claim 7, wherein the electric motor is a permanent magnet assisted reluctance motor.

* * * * *